United States Patent Office 3,585,180
Patented June 15, 1971

3,585,180
PROCESS FOR PREPARING PEPTIDES CONTAINING HISTIDINE PROTECTED WITH A 2,2,2,-TRIHALOGENO - N - BENZYLOXYCARBONYL-AMINOETHYL GROUP
Friedrich Weygand and Wolfgang Steglich, Munich, Germany, and Piergiogio Pietta, Milan, Italy; Johanna Gertrud Erika Weygand, nee Schneider, executrix and administratrix of said Otto Friedrich Peter Weygand, deceased, assignors to Farbwerke Hoechst Aktiengesellschaft vormals Meister Lucius & Bruning, Frankfurt am Main, Germany
No Drawing. Continuation-in-part of application Ser. No. 642,302, May 31, 1967. This application June 30, 1969, Ser. No. 837,898
Claims priority, application Germany, June 1, 1966, F 49,354
Int. Cl. C07c *103/52;* C07d *49/36*
U.S. Cl. 260—112.5       2 Claims

ABSTRACT OF THE DISCLOSURE

A process for preparing peptides containing histidine wherein the imidazole nitrogen atom is protected by a 2,2,2-trihalogeno-N-benzyloxycarbonylaminoethyl group.

---

This application is a continuation-in-part of application Ser. No. 642,302, filed May 31, 1967, now abandoned.

The present invention relates to a process for the preparation of peptides containing histidine, the imidazole nitrogen atom of which is protected with a 2,2,2-trihalogeno-N-benzyloxycarbonylaminoethyl group.

The synthesis of histidine-containing peptides is for many reasons particularly difficult. N α-acyl-derivatives of histidine and histidine-containing N-acyl-peptides have zwitter ion character with all their inherent disadvantages, for example difficult solubility in aprotic solvents on the one hand, and solubility in aqueous acids on the other hand.

It is already known to block the imino group of histidine reversibly. For this purpose, acyl radicals such as the benzyloxycarbonyl radical or the tosyl radical have been used. However, these methods involve the disadvantage that, in the case of a necessary ester hydrolysis, these radicals are split off by alkaline agents and, in addition thereto, that they, as activated acid amides, are able to transfer the acyl radical. The N$^{im}$-benzyl- or N$^{im}$-trityl-derivatives likewise used do not reduce the basicity. The disturbing solubility in acids is thus retained.

An imino-protective group for the histidine should (a) reduce the basicity of the imidazole ring, (b) be stable in the reactions commonly used in peptide syntheses, and (c) be easily introducible and, after completed peptide synthesis, be easily removable in a manner not affecting the peptide linkages.

These requirements are met by the 2,2,2-trihalogeno-1-benzyloxycarbonylaminoethyl group (I)

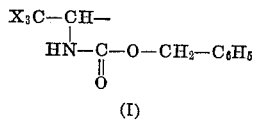

(I)

X=F, Cl, or combination of F and Cl used in the process of the present invention. The invention relates to an improved process for the manufacture of peptides built up from amino acids by condensing, in a series of standard peptide condensation reactions, members selected from the group consisting of naturally occurring α-amino-acids, peptides built up from said amino acids, and derivatives thereof, and wherein at least one component of said members is histidine. More in particular, the claimed improvement comprises protecting the imidazole nitrogen atom of the histidine radical with a 2,2,2 - trihalogeno - N - benzyloxycarbonylaminoethyl group.

The term "naturally occurring amino acids" used herein is to be understood as referring to all naturally occurring amino acids in their L- or D-form, for example alanine, arginine, aspartic acid, cystine, cysteine, glutamic acid, glycine, histidine, hydroxylysine, hydroxyproline, isoleucine, leucine, lysine, methionine, ornithine, phenylalanine, proline, serine, threonine, tyrosine and valine.

The introduction of the new protective group, for example into N α-acyl-histidines such as tert. butyloxycarbonyl - L - histidinemethyl ester, or into histidine-containing N-acyl-peptides or their esters such as N-benzyloxycarbonyl-L-valyl-L-histidine or the methyl ester thereof, can be effected with a high yield by reaction thereof with N-benzyloxycarbonyl - 1 - trihalogeno-acetaldimes (II), which are prepared and isolated, or are prepared in the reaction medium, from 2,2,2-trihalogeno-1-ethanesulfonyl - N - benzyloxycarbonylethylamines or 1,2,2,2,-tetrahalogeno-N-benzyloxycarbonylethylamines, or from other 2,2,2 - trihalogeno-N-benzyloxycarbonylethylamines (III) which have in the 1-position a radical which is removable as an anion by the action of a base such as triethylamine.

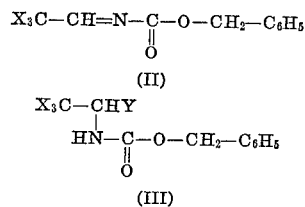

In the above Formulas II and III, X is F and/or Cl and Y represents chlorine, bromine, sulfonylalkyl, ureidoalkylsulfonyl (SO$_2$CH$_2$CH$_2$—NH—CO—NH$_2$), or the azide radical.

1,2,2,2 - tetrahalogeno - N - benzyloxycarbonylethylamines can be prepared in a manner analogous to that described in J. Ind. Chem. Soc., Volume 13, page 117 (1936). 2,2,2-trifluoro-1-chloro - N - benzyloxycarbonylethylamine and the corresponding 1,2,2,2-tetrafluoro compound are obtained in known manner from the adducts of the corresponding trihalogeno-acetaldehydes with benzyl carbamate, as described for other acid amides by Meldrum et al., J. Indian Chem. Soc., 11 (1934), page 217 and 13 (1936), pages 117–118. Said adducts are treated with phosphorus pentachloride according to the last mentioned reference:

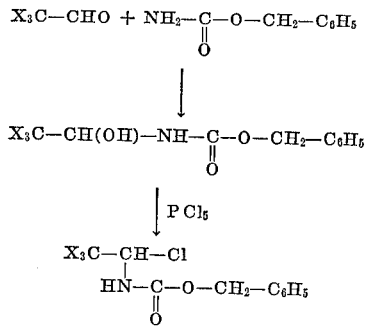

For example, 1,2,2,2-tetrachloro-N-benzyloxycarbonylethylamine can be prepared by heating a mixture of equivalent amounts of benzyl carbamate and chloral hydrate (trichloroacetaldehyde-hydrate) in the presence of a small amount of concentrated sulfuric acid.

58 parts by weight of the adduct thus obtained were shaken together with 42 parts by weight of PCl$_5$ until dilution of the mixture was completed. The hot reaction mixture solidified on cooling. After treatment with petroleum ether, 50 parts of a crystalline compound were obtained. Melting point 28–29° C.

2,2,2 - trifluoro - 1 - chloro-N-benzyloxycarbonylethylamine (melting point 101–102° C.) was prepared in analogous fashion using trifluoroacetaldehyde instead of trichloroacetaldehyde as the starting compound.

The N-acyl-$N^{im}$ - 2,2,2 - trihalogeno - 1 - benzyloxycarbonyl aminoethyl-histidines or the corresponding peptide derivatives obtained according to the invention have only a very low basicity and are much more soluble in organic solvents than are the same compounds not substituted at the imidazole ring. For example, N-benzyloxycarbonylamino-L-valyl-L-($N^{im}$-2,2,2 - trifluoro - 1 - benzyloxycarbonylaminoethyl)-histidine is sparingly soluble in water at pH 4, whereas the $N^{im}$-unsubstituted compound is soluable at pH 4. The same $N^{im}$-substituted compound can also not be extracted from a solution in chloroform with 0.5 mol of citric acid. However, it is soluble in dilute aqueous hydrochloric acid.

Among the trihalogeno-acylaminoethyl groups, the trifluoro compounds are particularly preferred if an alkaline hydrolysis is carried out in the course of the peptide synthesis.

For preparing peptides according to the present invention, the condensation methods usual in peptide chemistry may be used, such as the carbodiimide or the azide method, or, for example, the method of mixed anhydrides or of activated esters.

Other functional groups of the amino acids, for example, —OH, —SH, —NH$_2$, and —COOH groups, may or must be protected by methods generally used in peptide chemistry (cf. E. Schröder and K. Lübke, The Peptides, New York and London (1965), vol. I, especially pages 3 to 75).

In addition to the protective groups already mentioned above, the following groups may be used for this purpose:

(1) amino groups can be protected by tert-butoxycarbonyl, o-nitrophenylsulfenyl, p-methoxybenzyloxycarbonyl, or adamantyloxycarbonyl groups;
(2) sulfhydryl groups can be protected by trityl, benzhydryl, α,α-dimethyl - 4 - methoxybenzyl,α,α-4-trimethylbenzyl, 1-phenylcyclohexyl, or p-methoxyphenylcyclohexyl-(1) groups;
(3) carboxyl groups can be protected by tert-butyl, 2,4,6-trimethbenzyl, or p-methoxybenzyl groups; and
(4) hydroxyl groups can be protected by tert-butyl groups.

Splitting off of the new protective groups proceeds under the conditions which are characteristic for the splitting off of the acyl radicals contained in them. In this reaction, there are primarily formed compounds containing the structure

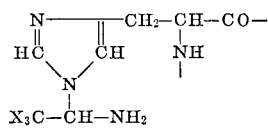

which compounds are decomposed by the addition of water or alcohols into trihalogeno-acetaldehyde-hydrate or trihalogenoacetaldehyde-semi-acetals, ammonia, and the histidine-containing peptide with a free imidazole ring.

Thus, for example, the 2,2,2-trifluoro-1-benzyloxycarbonylethyl radical can be removed by catalytic hydrogenation in methanol with the addition of a small amount of glacial acetic acid or by heating with trifluoroacetic acid (45 minutes under reflux) and digestion with water or methanol.

The following examples illustrate the invention but are not intended to limit it thereto:

EXAMPLE 1

N - benzyloxycarbonyl - L - valyl-L-($N^{im}$2,2,2-trifluoro-1 - N - benzyloxycarbonylaminoethyl)-histidine methyl ester 0.6 g. of 2,2,2-trifluoro-1-chloro-N-benzyloxycarbonylethylamine was dissolved in 15 ml. of absolute tetrahydrofurane, 0.21 g. of triethylamine was added and the triethylammonium chloride that had precipitated was removed after 5 minutes by filtration with suction, the filtrate passing into the solution of 0.8 g. of N-benzyloxycarbonyl-L-valyl-L-histidine methyl ester in 15 ml. of absolute tetrahydrofuran. After allowing the whole to stand for 2 hours at room temperature (20° C.), the filtrate was evaporated under reduced pressure, the residue was dissolved in chloroform, the chloroform solution was washed with 0.5 mol of citric acid and water, dried over sodium sulfate, and evaporated. The residue was recrystallized from a mixture of benzene and petroleum ether. Yield 83%. Melting point 62–64° C.

$[\alpha]_{546}^{25} = -10.0$ (c.=1 in methanol).

EXAMPLE 2

N - benzyloxycarbonyl - L - valyl-L-($N^{im}$-2,2,2-trifluoro-1 - N - benzyloxycarbonylaminoethyl-(histidine methyl ester 0.825 g. (2 millimols) of N - benzyloxycarbonyl-L-valyl-L-histidinemethyl ester and 0.54 gram of 2,2,2-trifluoro-1-chloro-N-benzyloxycarbonylethylamine were dissolved in 15 ml. of absolute tetrahydrofuran. A solution of 0.202 g. of triethylamine in 5 ml. of absolute tetrahydrofuran was added and the whole was allowed to stand for 2 hours at room temperature (20° C.). It was then evaporated under reduced pressure, the residue was dissolved in chloroform and the triethylammonium chloride that had formed was extracted by shaking with water; the solution was then washed with 0.5 ml. of citric acid and water, dried over sodium sulfate and evaporated. The residue was recrystallized from a mixture of benzene and petroleum ether. Yield 85%. Melting point 62–64° C.

EXAMPLE 3

N - benzyloxycarbonyl - L - valyl-L-($N^{im}$-2,2,2-trifluoro-1-N-benzyloxycarbonylaminoethyl)-histidine 2.12 g. (5 millimols) of N-benzyloxycarbonyl-L-valyl-L-histidine hydrochloride and 1.44 gram (5 millimols) of 2,2,2 - trifluoro-1-chloro-N-benzyloxycarbonylethylamine were dissolved in 20 ml. of absolute dimethylformamide. A solution of 1.0 g. (10 millimols) of triethylamine in 10 ml. of absolute dimethylformamide was added. After allowing the whole to stand for 2 hours at 20° C., the triethylammonium chloride that had precipitated was filtered off, the solution was evaporated in a vacuum produced by an oil pump, the residue was taken up in ethyl acetate, the ethyl acetate solution was washed with 0.5 mol of citric acid and water, dried over sodium sulfate, and evaporated. The residue was recrystallized from a mixture of benzene and petroleum ether. Yield 88%. Melting point 90° C., sintering starting from 75° C. on $[\alpha]_{546}^{25}: -8°$ c=1 in methanol).

The same compound was also prepared in the following manner:

0.633 g. of the methyl ester prepared according to Example 1 was allowed to stand for 2 hours at 20° C. in 15 ml. of dioxane, 5 ml. of water and 2.5 ml. of NaOH. The whole was then evaporated under reduced pressure (bath temperature up to 30° C.) and dissolved in water. The solution was acidified to pH 4 by means of 0.5 mol of citric acid, whereupon the N-benzyloxycarbonyl-L-valyl - L - ($N^{im}$ - 2,2,2-trifluoro-1-N-benzyloxycarbonylaminoethyl)-histidine precipitated. Yield 92%. Melting point 90° C., sintering starting from 75° C. on.

EXAMPLE 4

N - benzyloxycarbonyl - L - (N$^{im}$-2,2,2-trichloro-1-N-benzyloxycarbonylaminoethyl)-histidinemethyl ester The above compound was prepared from N-benzyloxycarbonyl-L-histidine methyl ester and 1,2,2,2-tetrachloro-N-benzyloxycarbonylethylamine in tetrahydrofuran with the addition of triethylamine in a manner analogous to that described in Example 2. Yield 85%, melting point 65–70° C.

EXAMPLE 5

N - benzyloxycarbonyl - L - valyl-L-(N$^{im}$-2,2,2-trichloro-1-N-benzyloxycarbonylaminoethyl)-histidine The above compound was prepared in a manner analogous to that described in Example 3 from N-benzyloxycarbonyl-L-valyl-L-histidine hydrochloride and 1,2,2,2-tetrachloro-N-benzyloxycarbonylethylamine. Yield 90%, melting point 55–60° C.

EXAMPLE 6

N - benzoyloxycarbonyl-L-valyl-L-(H$^{im}$-2,2,2-trifluoro-1-N - benzyloxycarbonylaminoethyl) - histidyl-L-leucine-benzyl ester 0.62 g. (1 millimol) of N-benzyloxycarbonyl-L-valyl-L - (N$^{im}$ - 2,2,2 - trifluoro-1-N-benzyloxycarbonylaminoethyl)-histidine and 0.393 g. (1 millimol) of L-leucine-benzyl ester p-toluenesulfonate were suspended in 15 ml. of absolute tetrahydrofuran. A solution of 0.1 g. of triethylamine (1 millimol) in 5 ml. of absolute tetrahydrofuran was added, whereupon a clear solution was formed. The solution was cooled to −20° C. and combined with 0.246 gram (1.2 millimols) of dicyclohexylcarbodiimide and 0.23 gram (2 millimols) of N-hydroxysuccinimide. After stirring the whole for 2 hours at −20° C., it was stored overnight at +4° C. and then the dicyclohexyl urea that had precipitated was removed by filtration. The solution was evaporated under reduced pressure, the residue was taken up in ethyl acetate. The ethyl acetate solution was washed with 0.5 mol of citric acid, a saturated sodium, bicarbonate solution, and water, and then evaporated. The residue was recrystallized from a mixture of benzene and petroleum ether. Yield 80–85%. Melting point 70° C.

In order to remove all protective groups, the tripeptide derivative was subjected to catalytic hydrogenation in methanol with palladium/charcoal as the catalyst. The free tripeptide was found to be identical with an authentic sample.

EXAMPLE 7

N-tert. butyloxycarbonyl - L- (N$^{im}$-2,2,2 - trifluoro - 1 - N - benzyloxycarbonylaminoethyl) - histidine methyl ester 0.8 g. (3 millimols) of N - tert. butyloxycarbonyl-L-histidine methyl ester and 0.8 g. (3 millimols) of 2,2,2-trifluoro - 1 - chloro - N - benzyloxycarbonylethylamine were dissolved in 15 ml. of absolute tetrahydrofuran and the whole was combined with a solution of 0.303 g. of triethylamine in 5 ml. of absolute tetrahydrofuran. After allowing the whole to stand for 2 hours at 20° C., it was evaporated under reduced pressure, taken up in chloroform, washed with water, 0.5 ml. of a solution of citric acid, and again with water, then dried over sodium sulfate and evaporated. The residue was recrystallized from a mixture of benzene and petroleum ether. Yield, 90%, melting point, 35–40° C.

EXAMPLE 8

H-His-Phe-Arg-Try-Gly-OH (a) N-tert. butyloxycarbonyl - L - (N$^{im}$ - 2,2,2 - trifluoro - 1 - N - benzyloxycarbonylaminoethyl) - His - Phe - Arg(NO$_2$) - Try - Gly - OMe.H$_2$O.—8.0 grams of H - Phe - Arg(NO$_2$) - Try - Gly - OMe.2HBr.H$_2$O, prepared according to Chemische Berichte, 96, 1083 (1963) were dissolved in 60 ml. of dimethylformamide. After the addition of 2.78 ml. of triethylamine, 2.3 g. of N-hydroxysuccinimide, and 4.53 g. of N-tert. butyloxycarbonyl-L-(N$^{im}$ - 2,2,2 - trifluoro - 1 - N - benzyloxycarbonylaminoethyl) - histidine - OH $([\alpha]^{23}_{546} = -4°$, c.=1 in methanl)

obtained by hydrolysis of the methyl ester described in Example 7, the mixture was cooled to −10° C. and 2.1 g. of dicyclohexylcarbodiimide were added. The mixture was held for 1 hour at −10° C. and for 4 hours at room temperature. Undissolved material was removed by filtration, and the filtrate was evaporated in vacuum. The residue was treated with water and ethanol. The compound is chromatographically pure. Yield 8.9 g.

$C_{50}H_{60}N_{12}O_{10}F_3.H_2O$ (M.W.=1120.1).—Calc. (percent): N=15.01, F=5.09. Found (percent): N=15.2, F=5.0.

(b) N-tert. butyloxycarbonyl - L - (N$^{im}$ - 2,2,2 - trifluoro - 1 - N - benzyloxycarbonylaminoethyl) - histidine-Phe-Arg(NO$_2$)-Try-Gly-OH.H$_2$O.—1.12 g. of the methyl ester obtained above were hydrolyzed in 12 ml. of 80 percent aqueous dioxane with 1.3 ml. of 1 N NaOH over a period of thirty minutes. 1.3 ml. of 1 N HCl were then added and the reaction product precipitated with water. Treatment of the precipitate with water, ethanol, and ether gave a compound which was chromatographically pure and showed no traces of starting compound. Yield, 0.97 g.

(c) H-His-Phe-Arg-Try-Gly-OH.—0.5 g. of the protected pentapeptide were hydrogenated over a palladium catalyst in 90 percent aqueous acetic acid over a period of 15 hours. The catalyst was removed by filtration. The filtrate was evaporated in vacuum and treated for one hour with trifluoroacetic acid. The reaction product was precipitated with ether. The compound is identical in its paper- and thin-layer-chromatograms in various solvents with a product prepared according to the litertaure.

We claim:
1. In a process for the synthesis of peptides built up from α-amino acids by condensing, in a series of standard peptide condensation reactions, members selected from the group consisting of naturally-occurring α-amino acids and peptides built up from said amino acids, wherein all functional groups other than those reacting in said condensation reactions are protected and wherein at least one component of said members is histidine, the improvement which comprises protecting the imidazole nitrogen atom of the histidine during said condensation reactions with a 2,2,2 - trihalogeno - N - benzyloxycarbonylaminoethyl group, the halogen atoms of which are selected from the group consisting of chlorine and fluorine.

2. A process as in claim 1 wherein the histidine-containing member is reacted with a 1,2,2,2 - tetrahalogeno-N-benzyloxycarbonylethylamine at room temperature in the presence of triethylamine, the 1-halogen atom being chlorine or bromine, and the 2-halogen atoms being chlorine or fluorine, to form the protective group on the imidazole nitrogen atom.

References Cited

Weygand et al., Berichte 99, 1932–1943 (1966).
Weygand et al., Tetrahedron Letters, 1966 (31), 3751–3754.

LEWIS GOTTS, Primary Examiner
M. KASSENOFF, Assistant Examiner

U.S. Cl. X.R.
260—309, 349, 481, 482